US010899358B2

(12) United States Patent
Persia et al.

(10) Patent No.: US 10,899,358 B2
(45) Date of Patent: Jan. 26, 2021

(54) VEHICLE DRIVER MONITORING SYSTEM AND METHOD FOR CAPTURING DRIVER PERFORMANCE PARAMETERS

(71) Applicant: Accenture Global Solutions Limited, Dublin (IE)

(72) Inventors: Giovanni Persia, Rome (IT); Fabio Mungo, Rome (IT); Emilio Paterlini, Cisterna di Latina (IT)

(73) Assignee: Accenture Global Solutions Limited, Dublin (IE)

( * ) Notice: Subject to any disclaimer, the term of this patent is extended or adjusted under 35 U.S.C. 154(b) by 0 days.

(21) Appl. No.: 16/426,682

(22) Filed: May 30, 2019

(65) Prior Publication Data
US 2019/0367039 A1 Dec. 5, 2019

Related U.S. Application Data

(60) Provisional application No. 62/678,642, filed on May 31, 2018.

(51) Int. Cl.
*G08B 23/00* (2006.01)
*B60W 40/09* (2012.01)
(Continued)

(52) U.S. Cl.
CPC ............ *B60W 40/09* (2013.01); *B60W 50/14* (2013.01); *G06K 9/00845* (2013.01); *B60W 2050/146* (2013.01)

(58) Field of Classification Search
CPC ................. B60W 40/09; B60W 50/14; B60W 2050/146; G06K 9/00845
(Continued)

(56) References Cited

U.S. PATENT DOCUMENTS 8,576,286 B1* 11/2013 Childs .................. H04N 13/246
348/148
2009/0243880 A1* 10/2009 Kiuchi ................... G08G 1/166
340/903
(Continued)

FOREIGN PATENT DOCUMENTS

EP 3576037 12/2019
WO 2014/143624 A1 9/2014

OTHER PUBLICATIONS

Extended European Search Reported dated Sep. 16, 2019 for European Patent Application No. 19177696.2.
(Continued)

*Primary Examiner* — Zhen Y Wu
(74) *Attorney, Agent, or Firm* — Plumsea Law Group, LLC

(57) ABSTRACT

A vehicle driver monitoring system and method for capturing driver performance parameters is disclosed. The vehicle driver monitoring system and method uses multiple data sources to capture driver performance parameters. Data from one source can be used to validate data from another data source. Additionally, the data from one data source can be used to compensate for missing or corrupt data from the other data source. The vehicle driver monitoring system and method uses a mobile app on a mobile device that can automatically sense when a registered driver is in the vehicle with the mobile device, which helps the vehicle driver monitoring system verify that captured performance parameters are related to the registered driver driving the vehicle. The mobile app can also communicate with the driver in real time.

20 Claims, 5 Drawing Sheets

(51) Int. Cl.
*B60W 50/14* (2020.01)
*G06K 9/00* (2006.01)

(58) Field of Classification Search
USPC .......................................................... 340/576
See application file for complete search history.

(56) References Cited

U.S. PATENT DOCUMENTS

| | | | | |
|---|---|---|---|---|
| 2011/0169625 | A1* | 7/2011 | James | G06K 9/00597 340/439 |
| 2012/0282908 | A1* | 11/2012 | Nicolini | H04W 4/023 455/418 |
| 2013/0006674 | A1* | 1/2013 | Bowne | H04W 4/40 705/4 |
| 2013/0190967 | A1* | 7/2013 | Hassib | G07C 5/0808 701/31.5 |
| 2014/0046701 | A1* | 2/2014 | Steinberg | G06Q 40/08 705/4 |
| 2014/0111647 | A1* | 4/2014 | Atsmon | G08G 1/04 348/148 |
| 2014/0170977 | A1* | 6/2014 | Ryan | B60R 11/0241 455/41.1 |
| 2014/0210978 | A1* | 7/2014 | Gunaratne | G06K 9/00845 348/77 |
| 2014/0372017 | A1* | 12/2014 | Armitage | B60W 40/09 701/117 |
| 2015/0106289 | A1* | 4/2015 | Basir | G07C 5/08 705/325 |
| 2016/0371550 | A1* | 12/2016 | Springer | B60W 50/14 |
| 2017/0021764 | A1* | 1/2017 | Adams | G07C 5/0825 |
| 2017/0058811 | A1* | 3/2017 | Misson | F02D 41/2487 |
| 2017/0200324 | A1* | 7/2017 | Chennakeshu | H04L 12/40104 |
| 2017/0206717 | A1* | 7/2017 | Kuhnapfel | G09B 19/167 |
| 2017/0309092 | A1* | 10/2017 | Rosenbaum | G01M 17/007 |
| 2018/0020160 | A1* | 1/2018 | Lin | H04N 5/2254 |
| 2018/0047107 | A1* | 2/2018 | Perl | G06Q 20/10 |
| 2018/0084103 | A1* | 3/2018 | Hamilton | H04M 1/72577 |
| 2018/0237027 | A1* | 8/2018 | Lundsgaard | G06Q 40/08 |
| 2019/0213429 | A1* | 7/2019 | Sicconi | G06F 3/013 |
| 2020/0089487 | A1* | 3/2020 | Ramic | G06F 8/65 |

OTHER PUBLICATIONS

Jim Levendusky, "Telematics data exchange needed for auto insurance industry", published Jul. 1, 2015; https://www.verisk.com/insurance/visualize/telematics-data-exchange-needed-for-auto-insurance-industry/ [retrieved Aug. 12, 2019].

* cited by examiner

VEHICLE DRIVER MONITORING SYSTEM AND METHOD FOR CAPTURING DRIVER PERFORMANCE PARAMETERS

CROSS-REFERENCE TO RELATED APPLICATION(S)

This application claims priority to Persia et al., U.S. Provisional Patent Application Ser. No. 62/678,642, entitled "Vehicle Driver Monitoring System and Method for Capturing Driver Performance Parameters", filed on May 31, 2018, the entirety of which is hereby incorporated by reference.

TECHNICAL FIELD

The present disclosure generally relates to monitoring driver performance. More specifically, the present disclosure generally relates to a vehicle driver monitoring system and method for capturing driver performance parameters. Even more specifically, the present disclosure generally relates to a vehicle driver monitoring system and method for capturing driver performance parameters from multiple data sources.

BACKGROUND

Driver monitoring is a way of tracking driver performance to determine a risk level for a driver. Driver monitoring is often used by insurance companies to categorize a driver with a risk level, which is used to determine the driver's insurance rate. For example, drivers categorized as preferred risk drivers may be offered lower rates than drivers categorized as standard or high risk drivers. Insurance companies use a driver's personal information, such as age and history of accidents and traffic tickets as indicators to help categorize a driver with a risk level. To gather even more data about the behavior of drivers, insurance companies often mount telematics boxes in drivers' vehicles. The telematics boxes include sensors that track the speed, acceleration, and braking of the vehicle. The insurance company can access the information recorded by the telematics box. However, the driver does not have access to the same information. Also, this information recorded by the telematics box is only made available after the fact and is not provided in real time.

Insurance programs using telematics boxes to track driver behavior typically only use the information provided by the telematics box. If the telematics box has any sort of failure or error in monitoring or recording data, the single source of data makes it impossible to verify that a failure or error has occurred because no other data is available for comparison. This means that the information provided by a single source of data is unreliable. Additionally, only one data source means that no other data source is available to compensate for the data source that has had a failure or error. When there is a failure or error with a single source of data, the entire system loses an opportunity to gather accurate data.

Telematics boxes usually do not identify who is driving the vehicle outfitted with the telematics box. This means that the telematics box will monitor and record data related to the vehicle without respect to a particular driver.

Third party companies typically provide telematics boxes. As a result, the insurance company and/or the driver must sign an agreement with the third party to obtain the telematics box. This additional relationship with the third party increases cost in providing insurance by the insurance company and obtaining insurance by the driver. Also, coordinating with a third party to install a telematics box in a vehicle is inconvenient.

Other insurance programs may use a software application on a mobile device to track driver behavior. Similar to the telematics box, the software application on the mobile device is a single source of data and thus suffers from similar shortcomings as the telematics box. Additionally, the software application on the mobile device cannot verify that the data being obtained corresponds to a particular driver's operation of an insured vehicle. This means that the software application on the mobile device will monitor and record data related without respect to a particular driver or a particular vehicle.

There is a need in the art for a system and method that addresses the shortcomings discussed above.

SUMMARY

A vehicle driver monitoring system and method for capturing driver performance parameters is disclosed. The vehicle driver monitoring system and method solves the problems discussed above by using multiple data sources. Data from one source can be used to validate data from another data source. Additionally, the data from one data source can be used to compensate for missing or corrupt data from the other data source. As a result, the opportunity to gather data will be salvaged by one data source if another data source is malfunctioning.

The vehicle driver monitoring system and method further solves the problems discussed above by using a mobile app on a mobile device. The mobile app may be capable of verifying correct positioning of the mobile device in the particular insured vehicle and/or verifying the driver is the insured driver. For example, the mobile app can be used to register a driver. After registering once, the mobile app can automatically sense when the registered driver is in the vehicle with the mobile device. By sensing when the registered driver is driving the vehicle, the vehicle driver monitoring system can verify that captured performance parameters are related to the registered driver driving the vehicle. In another example, the mobile device may connect to a Bluetooth system in the vehicle to verify that the mobile device is positioned in the insured driver's vehicle.

In yet another example, the vehicle driver monitoring system may further include Near-Field Communication (NFC). For example, an NFC tag may be provided in the vehicle in a position where the mobile device may be set down. For example, an NFC tag may be placed on a mobile device holder. In this example, the NFC tag can identify when a registered driver's mobile device is cradled by the mobile device holder. This identification can verify that the registered driver is the person driving the vehicle while the multiple data sources are capturing driver performance parameters.

The mobile app can also communicate with the driver in real time. The mobile app can show the driver which performance parameters have been captured by data sources of the vehicle driver monitoring system. The mobile app can also issue warnings to the driver when predetermined driving conditions (e.g., speeding, oncoming vehicles, red lights, etc.) are sensed in real time. The mobile app can further communicate to the driver when a desired destination (e.g., gas station, restaurant, restroom, etc.) is approaching.

In some embodiments, no telematics box is included in the vehicle driver monitoring system. By eliminating the use of a telematics box, no third party contract adds expense or inconvenience to setting up the vehicle driver monitoring system. Providing data sources readily available without a third party contract reduces costs associated with monitoring driver performance and/or assessing the risk level of a driver.

In some embodiments, the vehicle driver monitoring system may include a digital platform to process (e.g., validate, normalize, analyze, organize, display, etc.) data. The digital platform may include a computer capable of connecting to the data sources (e.g., mobile device, dongle, etc.) to obtain driver behavior data. The digital platform may also be capable of connecting to a mobile app to display information to the driver and/or communicate with the driver, as mentioned above. Furthermore, the digital platform can be accessible by an insurer.

In one aspect, the disclosure provides a method of using a vehicle driver monitoring system for capturing driver performance parameters. The method may include receiving a first set of data indicative of driver performance associated with a driver driving a vehicle. The first set of data may be collected by a first data source while the first data source is within the vehicle and the driver is driving the vehicle. The method may include receiving a second set of data indicative of the driver performance. The second set of data may be collected by a second data source while the second data source is within the vehicle and the driver is driving the vehicle. The method may include using one or both of the first set of data and the second set of data to determine a risk level of a driver.

In yet another aspect, the disclosure provides a non-transitory computer-readable medium storing software that may comprise instructions executable by one or more computers which, upon such execution, cause the one or more computers to: (1) receive a first set of data indicative of driver performance associated with a driver driving a vehicle, wherein the first set of data is collected by a first data source while the first data source is within the vehicle and the driver is driving the vehicle; (2) receive a second set of data indicative of the driver performance, wherein the second set of data is collected by a second data source while the second data source is within the vehicle and the driver is driving the vehicle; and (3) use one or both of the first set of data and the second set of data to determine a risk level of a driver.

In yet another aspect, the disclosure provides a vehicle driver monitoring system for capturing driver performance parameters, which comprises one or more computers and one or more storage devices storing instructions that may be operable, when executed by the one or more computers, to cause the one or more computers to: (1) receive a first set of data indicative of driver performance associated with a driver driving a vehicle, wherein the first set of data is collected by a first data source while the first data source is within the vehicle and the driver is driving the vehicle; (2) receive a second set of data indicative of the driver performance, wherein the second set of data is collected by a second data source while the second data source is within the vehicle and the driver is driving the vehicle; and (3) use one or both of the first set of data and the second set of data to determine a risk level of a driver.

In one aspect, the disclosure provides a method of using a vehicle driver monitoring system for capturing driver performance parameters. The method may include receiving a first set of data indicative of driver performance associated with a driver driving a vehicle. The first set of data may be collected by a first data source while the first data source is within the vehicle and the driver is driving the vehicle. The method may include receiving a second set of data indicative of the driver performance. The second set of data may be collected by a second data source while the second data source is within the vehicle and the driver is driving the vehicle. The method may include using the first data source to determine an identity of the driver.

In yet another aspect, the disclosure provides a non-transitory computer-readable medium storing software that may comprise instructions executable by one or more computers which, upon such execution, cause the one or more computers to: (1) receive a first set of data indicative of driver performance associated with a driver driving a vehicle, wherein the first set of data is collected by a first data source while the first data source is within the vehicle and the driver is driving the vehicle; (2) receive a second set of data indicative of the driver performance, wherein the second set of data is collected by a second data source while the second data source is within the vehicle and the driver is driving the vehicle; and (3) use the first data source to determine an identity of the driver.

In yet another aspect, the disclosure provides a vehicle driver monitoring system for capturing driver performance parameters, which comprises one or more computers and one or more storage devices storing instructions that may be operable, when executed by the one or more computers, to cause the one or more computers to: (1) receive a first set of data indicative of driver performance associated with a driver driving a vehicle, wherein the first set of data is collected by a first data source while the first data source is within the vehicle and the driver is driving the vehicle; (2) receive a second set of data indicative of the driver performance, wherein the second set of data is collected by a second data source while the second data source is within the vehicle and the driver is driving the vehicle; and (3) use the first data source to determine an identity of the driver.

Other systems, methods, features, and advantages of the disclosure will be, or will become, apparent to one of ordinary skill in the art upon examination of the following figures and detailed description. It is intended that all such additional systems, methods, features, and advantages be included within this description and this summary, be within the scope of the disclosure, and be protected by the following claims.

While various embodiments are described, the description is intended to be exemplary, rather than limiting and it will be apparent to those of ordinary skill in the art that many more embodiments and implementations are possible that are within the scope of the embodiments. Although many possible combinations of features are shown in the accompanying figures and discussed in this detailed description, many other combinations of the disclosed features are possible. Any feature or element of any embodiment may be used in combination with or substituted for any other feature or element in any other embodiment unless specifically restricted.

This disclosure includes and contemplates combinations with features and elements known to the average artisan in the art. The embodiments, features and elements that have been disclosed may also be combined with any conventional features or elements to form a distinct invention as defined by the claims. Any feature or element of any embodiment may also be combined with features or elements from other inventions to form another distinct invention as defined by the claims. Therefore, it will be understood that any of the features or aspects shown and/or discussed in the present disclosure may be implemented singularly or in any suitable combination. Accordingly, the embodiments are not to be restricted except in light of the attached claims and their equivalents. Also, various modifications and changes may be made within the scope of the attached claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

DETAILED DESCRIPTION

Figure 1:
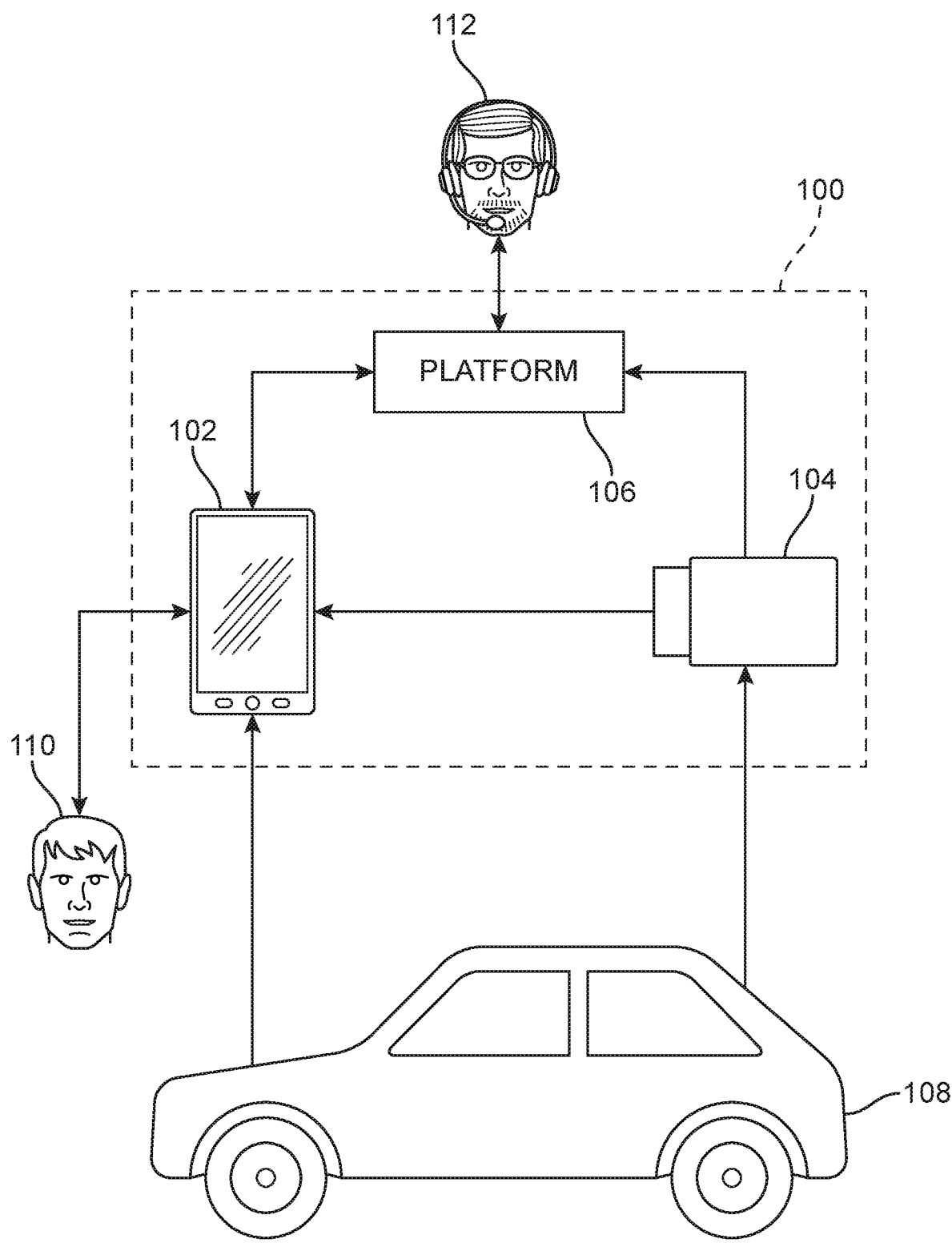
FIG. 1 is a schematic diagram of an example embodiment of a vehicle driver monitoring system.

A vehicle driver monitoring system and method for capturing driver performance parameters is disclosed. The present embodiments described herein provide a system and method that uses multiple sources of data to produce, monitor, and analyze telemetric data associated with a vehicle and a driver of that vehicle to provide various driver safety, performance, and behavior metrics. Moreover, the techniques presented herein leverage artificial intelligence capabilities to provide a wide range of data, information, and services to insurers and/or drivers. Referring now to FIG. 1, an example embodiment of a vehicle driver monitoring system 100 is shown. In this embodiment, vehicle driver monitoring system 100 is configured to capture a plurality of driver performance parameters associated with a driver 110 driving a vehicle 108 and can communicate the parameters to driver 110 and/or an insurer 112.

Generally, a vehicle driver monitoring system according to the present embodiments includes multiple data sources configured to capture driver performance parameters associated with a driver driving a vehicle. For example, as shown in FIG. 1, vehicle driver monitoring system 100 includes at least a mobile device 102 and a dongle 104 capable of connecting with a vehicle's on-board diagnostic system. For example, dongle 104 may be a device which is plugged into the on-board diagnostic (OBD) port of vehicle 108 in order to provide diagnostics data via a short-range wireless communication system (e.g., Bluetooth) to a connected computing device, such as a mobile device (e.g., mobile device 102) or a telematics control unit (TCU) in vehicle 108.

In some embodiments, one of the multiple data sources can be a mobile device. For example, mobile device 102 may include a smartphone, tablet computing device, laptop, etc. In the embodiment shown in FIG. 1, mobile device 102 is a smartphone. By using a mobile device as a data source, the mobile device can also be used as an interface with the driver. For example, mobile device 102 can act as a data source by using its internal accelerometer to sense and capture accelerations of a vehicle. In the same example, mobile device 102 can also act as an interface with the driver by providing access to a mobile app that can display data from the data sources and can communicate with the driver. When the mobile device acts as a data source, the mobile device may use its internal sensors, such as a three-axis gyroscope, an accelerometer, a proximity sensor, an ambient light sensor, a global positioning system (GPS) sensor, a camera, and charger information, etc. to sense and capture driver performance parameters associated with a driver driving a vehicle while the mobile device is in the vehicle.

In some embodiments, a vehicle driver monitoring system may include a digital platform. For example, vehicle driver monitoring system 100 includes a digital platform 106. The digital platform can receive data from the multiple data sources. For example, digital platform 106 can receive data from mobile device 102 and/or dongle 104. The digital platform can process (e.g., validate, normalize, analyze, organize, display, etc.) data. The digital platform may be capable of connecting to the data sources (e.g., mobile device, dongle, etc.) to obtain driver behavior data, including driver performance parameters. The digital platform may also be capable of connecting to a mobile app to display information to the driver and/or communicate with the driver, as mentioned above. Furthermore, the digital platform can be accessible by an insurer (e.g., insurer 112).

In some embodiments, the digital platform may include a server. The server may be a single computer, the partial computing resources of a single computer, a plurality of computers communicating with one another, or a network of remote servers (e.g., cloud). In some embodiments, the server may be in communication with a database. The server can work with the database to perform the method of the vehicle driver monitoring system described herein. In some embodiments, the digital platform may include an analytics engine. In some embodiments, the digital platform may include an insurance model.

The driver performance parameters associated with a driver driving a vehicle include parameters that are indicative of a driver's performance (or behavior) while driving the vehicle. In other words, the driver performance parameters are indicative of certain driver performance indicators that may be used to determine a driver's risk level. For example, the driver performance parameters may include one or more of speed, acceleration, braking, trajectory, number of overtakes (other vehicles passed), as well as distance from objects, such as curbs, pedestrians, and other vehicles. The driver performance indicators, or driver behavior, indicated by the driver performance parameters may include compliance with speed limit, compliance with stop lights and stop signs, and control of the vehicle, etc. The driver performance parameters may also be indicative of a driver's state (e.g., alert, drowsy, impaired, and unconscious, etc.). The driver performance parameters may further be indicative of conditions affecting a driver's behavior. For example, the driver performance parameters may further include the number of passengers in the vehicle, the brightness/dimness of ambient light, and road conditions, such as pot holes, rain, snow, obstacles, traffic, etc.

As previously mentioned, the vehicle driver monitoring system may include a dongle capable of connecting with a vehicle's on-board diagnostic system. The dongle can capture parameters sensed or measured by the vehicle's on-board diagnostic system. For example, the dongle may capture the diagnostic and status data of a vehicle that is sensed by the vehicle's on-board diagnostic system.

As shown by the arrows in FIG. 1, mobile device 102 and dongle 104 both capture driver performance parameters associated with driver 110 driving vehicle 108. Mobile device 102 can also receive data from dongle 104. Additionally, mobile device 102 can communicate with driver 110. As shown by the arrows in FIG. 1, platform 106 receives data from mobile device 102 and dongle 104. As shown by the arrows in FIG. 1, platform 106 may communicate back and forth with mobile device 102 and insurer 112.

Figure 2:
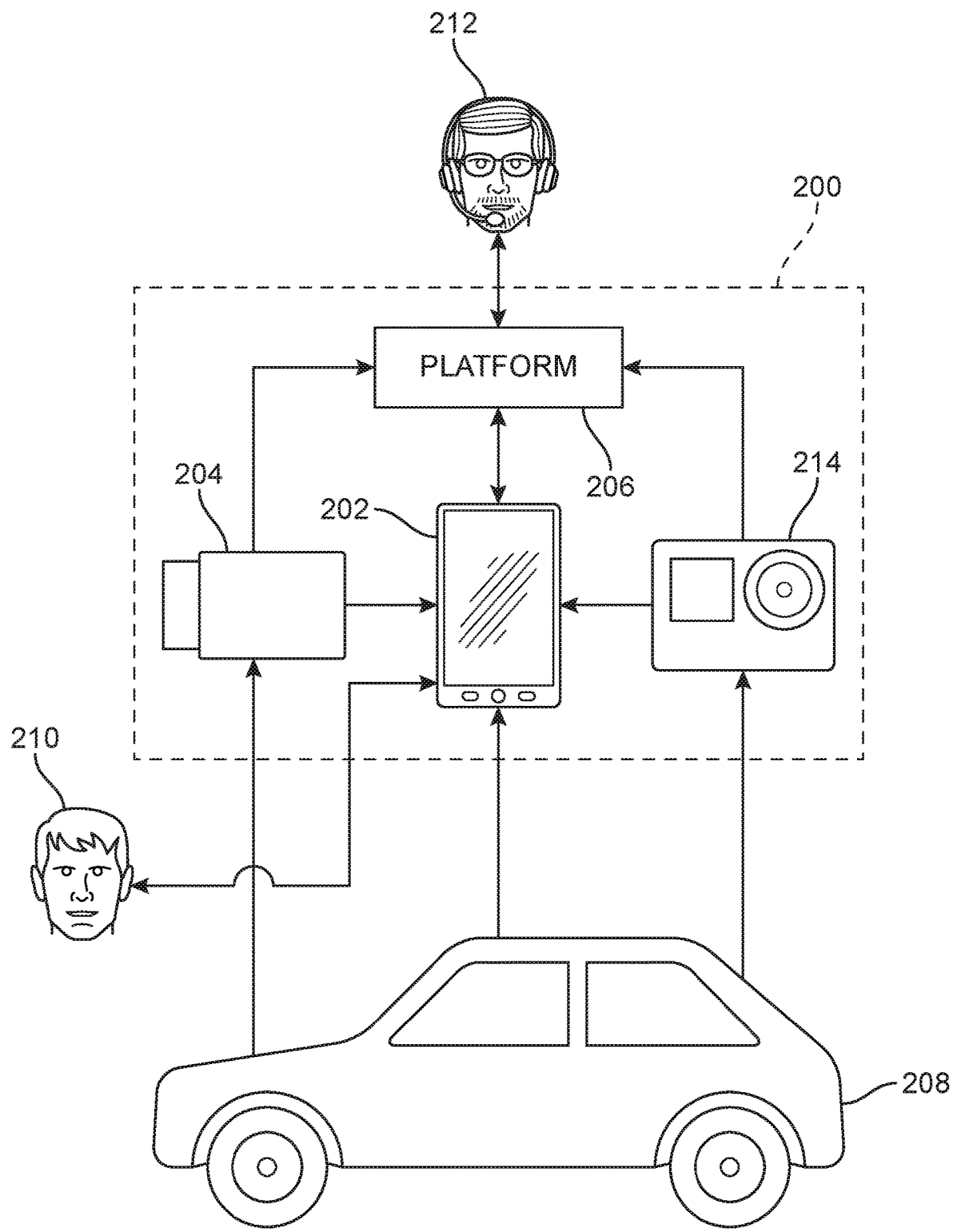
FIG. 2 is a schematic diagram of another example embodiment of a vehicle driver monitoring system.

In some embodiments, a vehicle driver monitoring system may include more than two data sources configured to capture driver performance parameters associated with a driver driving a vehicle. Referring now to FIG. 2, an example embodiment of a vehicle driver monitoring system 200 is illustrated capturing driver performance parameters associated with a driver 210 driving a vehicle 208 and communicating the parameters to driver 210 and an insurer 212. In this embodiment, vehicle driver monitoring system 200 includes a mobile device 202, a dongle 204 capable of connecting with a vehicle's on-board diagnostic system, and a camera 214. In some embodiments, one or more of the data sources can capture and provide data in real time.

As previously mentioned, the vehicle driver monitoring system may include a visual sensor or camera, for example, camera 214 shown in FIG. 2. The camera may be mounted on the dashboard or elsewhere inside of or on the outside of the vehicle. The camera may be positioned such that the camera can capture views relevant to driver performance. For example, mounting the camera on the dashboard shows the view of the road on which the vehicle is traveling so that the camera can monitor a scene in front of the vehicle (i.e., from the driver's perspective). The camera may include a digital camera capable of capturing still or video images. In some embodiments, the camera may be a 360-degree camera capable of capturing images from multiple perspectives simultaneously. By using a camera to capture images, the vehicle driver monitoring system may use visual data to monitor a scene from the vehicle and/or to determine driver performance parameters.

For example, in some embodiments, the camera may be used to track the distance between the vehicle and another vehicle, as well as the position of the other vehicle. Tracking this distance and position provides data about how the driver passes other vehicles. In some embodiments, the vehicle driver monitoring system may include a neural network that uses the images captured by the camera to determine the position of other vehicles and/or other driver performance parameters.

In another example, vehicle driver monitoring system 200 includes a digital platform 206. In this embodiment, digital platform 206 can receive data from mobile device 202, dongle 204, and camera 214. As shown by the arrows in FIG. 2, mobile device 202 and dongle 204 both capture driver performance parameters associated with driver 210 driving vehicle 208. Mobile device 202 can also receive data from dongle 204. Additionally, mobile device 202 can communicate with driver 210. As shown by the arrows in FIG. 2, platform 206 receives data from mobile device 202, dongle 204, and camera 214. Additionally, as shown by the arrows in FIG. 2, platform 206 may communicate back and forth with mobile device 202 and insurer 212.

While the examples described with respect to FIGS. 1 and 2 show embodiments in which the multiple data sources are of different types, in some embodiments, the multiple data sources may be of the same type. For example, one embodiment may include two or more cameras. In such an embodiment, the cameras may be mounted in different positions within and/or around the vehicle (e.g., to capture different perspectives).

In some embodiments, two data sources may capture different driver performance parameters associated with a driver driving a vehicle. For example, in the embodiment shown in FIG. 1, mobile device 102 may be capable of capturing the brightness of ambient light and dongle 104 may not have this capability. In another example, in the embodiment of FIG. 2, camera 214 may be capable of capturing an unsafe overtake (passing of a vehicle) and dongle 104 may not have this capability.

In some embodiments, two data sources may capture the same driver performance parameters associated with a driver driving a vehicle. For example, in the embodiment shown in FIG. 1, mobile device 102 may be capable of capturing speed and dongle 104 may have the same capability. In such embodiments, the two data sources may be used to validate the data provided from each other.

As mentioned above, the data from one data source can be used to validate or invalidate data from another data source. For example, in the embodiment shown in FIG. 1, mobile device 102 may sense a drastic acceleration and dongle 104 may capture data indicating the same drastic acceleration sensed by the on-board diagnostic system of vehicle 108. In this example, by capturing data indicating the same acceleration, the two data sources validate one another. As also mentioned above, the data from one data source can be used to compensate for a data source that is not functioning properly. For example, in the embodiment shown in FIG. 1, mobile device 102 may sense a drastic acceleration and dongle 104 may malfunction and not capture data indicative of the drastic acceleration. In this example, mobile device 102 may compensate for the malfunction of dongle 104. Also in this example, the cause of dongle 104 malfunctioning may be a malfunction of the on-board diagnostics system of vehicle 108.

In some embodiments, the combined data from the multiple data sources associated with the vehicle driver monitoring system may be collected by a mobile app on the mobile device (e.g., mobile device 102 and/or 202). This collected data may be further processed using artificial intelligence or other neural networks to filter, tune, merge, calculate, and/or extrapolate the collected data in order to determine various driver performance indicators or evaluate driver behavior. These driver performance indicators and evaluations of driver behavior may be used to provide a suggestion to the driver and/or to determine, modify, or adjust a risk level of the driver.

In some embodiments, the vehicle driver monitoring system may further include a mobile device holder. A mobile device holder can hold a mobile device (e.g., mobile device 102 and/or mobile device 202) in a single location, which helps with stability and consistency with collecting data. Additionally, a mobile device holder can help display the mobile device interface to a driver without requiring the driver to take her hands off the steering wheel. Furthermore, in some embodiments, the vehicle driver monitoring system may further include near-field communication (NFC). For example, an NFC tag may be provided on the mobile device holder. In this example, the NFC tag can identify when a registered driver's mobile device is cradled by the mobile device holder. This identification can verify that the registered driver is the person driving the vehicle while the multiple data sources are capturing driver performance parameters. In this manner, the vehicle driver monitoring system may validate that the driver performance parameters are correctly associated with the registered driver.

In some embodiments, one or more components of the driver monitoring system may communicate through a network. In some embodiments, the network may be a wide area network ("WAN"), e.g., the Internet. In other embodiments, the network may be a local area network ("LAN"). For example, in a more remote location far from a metropolitan area, the Internet may not be available. In yet other embodiments, the network may be a combination of a WAN and a LAN. In some embodiments, one or more of the components of the driver monitoring system may communicate through the Internet-of-Things. For example, in the embodiment shown in FIG. 1, mobile device 102 and dongle 104 may be connected to one another by the Internet-of-Things (i.e., via an Internet-of-Things cloud server). In another example, in the embodiment shown in FIG. 2, mobile device 202, dongle 204, and/or camera 214 may be connected to one another by the Internet-of-Things.

Figure 3:
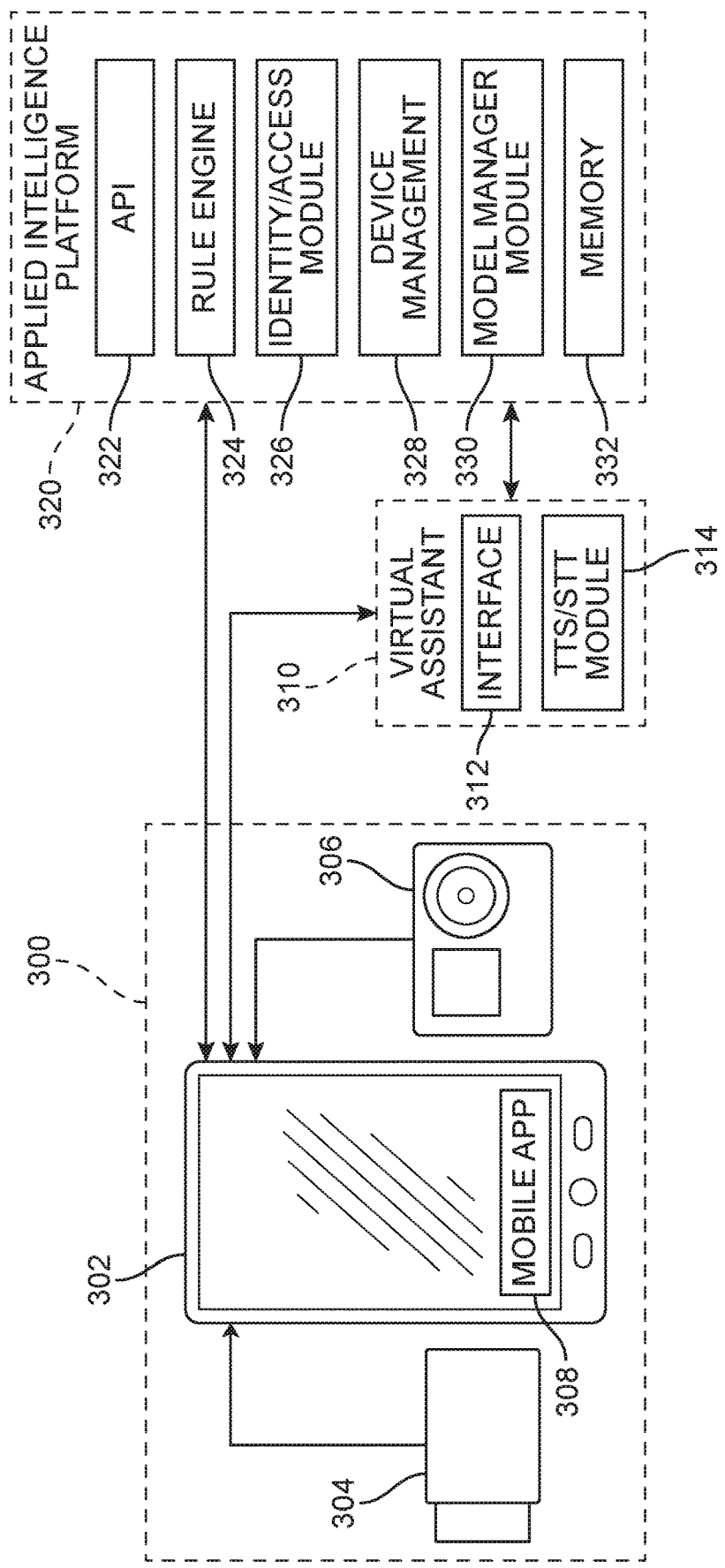
FIG. 3 is a schematic diagram of yet another example embodiment of a vehicle driver monitoring system.

In some embodiments, the vehicle driver monitoring system may also include virtual assistant functionality that can interact with a driver to provide driving suggestions and information to the driver, as well as communicate with the driver to answer various queries and complete tasks. Referring now to FIG. 3, an example embodiment of a vehicle driver monitoring system 300. In this embodiment, vehicle driver monitoring system 300 includes a mobile device 302, a dongle 304 capable of connecting with a vehicle's on-board diagnostic system, and a camera 306. Additionally, in this embodiment, vehicle driver monitoring system 300 includes a mobile app 308 associated with mobile device 302.

In some embodiments, mobile app 308 executing on mobile device 302 may provide various additional functionalities to vehicle driver monitoring system 300. For example, in an example embodiment, mobile app 308 may include an artificial intelligence algorithm that is configured to collect the data from the multiple data sources in the vehicle, for example, from one or more of mobile device 302, dongle 304, and/or camera 306. In these embodiments, the artificial intelligence algorithm associated with mobile app 308 may filter, tune, merge, calculate, and/or extrapolate the collected data in order to determine various driver performance indicators or evaluate driver behavior. Additionally, the artificial intelligence algorithm associated with mobile app 308 may interact with other resources to provide the various additional functionalities to vehicle driver monitoring system 300.

In this embodiment, the artificial intelligence algorithm associated with mobile app 308 may communicate and interact with a virtual assistant 310 and an applied intelligence platform 320. Virtual assistant 310 includes an interface 312 and a text-to-speech (TTS)/speech-to-text (STT) module 314. In some embodiments, virtual assistant 310 and/or interface 312 may be cloud-based and a driver may communicate and interact with interface 312 of virtual assistant 310 through mobile app 308 executing on mobile device 302.

In various embodiments, a driver may request information and/or provide commands to virtual assistant 310. A driver may ask virtual assistant 310, via interface 312 through mobile app 308, to provide information associated with the vehicle, the driver performance parameters, or other information. For example, a driver may ask about progress of a current trip, such as miles traveled or remaining, distances to various destinations or attractions, fuel consumption, directions to areas of interest, weather, etc. A driver may also provide instructions, such as commands to pay tolls or make other payments, instructions to other devices or components that are integrated with the driver's mobile device or accounts, etc.

TTS/STT module 314 is configured to format a driver's spoken requests and commands to virtual assistant 310 received via interface 312 from speech into text that can be recognized and processed by virtual assistant 310. Similarly, TTS/STT module 314 is also configured to format a response from virtual assistant 310 from text into simulated speech (i.e., sound) that can be played or communicated to the driver. With this arrangement, virtual assistant 310 can interact with the driver using voice commands and audio responses so that the driver can maintain focus and attention on driving the vehicle.

In some embodiments, virtual assistant 310 may also be configured to automatically provide driving feedback and driver performance parameters to the driver, as well as advertisements, tips, recommendations, and/or suggestions that the artificial intelligence algorithm associated with mobile app 308 on mobile device 302 may autonomously determine would be relevant or helpful to the driver based on the analysis of the collected data from vehicle driver monitoring system 300. For example, the artificial intelligence algorithm associated with mobile app 308 on mobile device 302 may provide tips to the driver about the driver's behavior that may influence (positively or negatively) the driver's risk level or safety in the vehicle, recommendations for service (e.g., low tire pressure, low oil or other fluid levels, etc.) or refueling, as well as other suggestions.

In some embodiments, the artificial intelligence algorithm associated with mobile app 308 on mobile device 302 may communicate with applied intelligence platform 320. Applied intelligence platform 320 may include models of driving behavior or other data associated with vehicles and/or drivers that can be used to identify patterns or similar circumstances so that the artificial intelligence algorithm associated with mobile app 308 on mobile device 302 can better evaluate driver behavior based on the collected data from vehicle driver monitoring system 300. In an example embodiment, applied intelligence platform 320 includes one or more of an application programming interface (API) 322, a rule engine 324, an identity/access module 326, a device management module 328, a model manager module 330, and a memory 332.

In some embodiments, the collected data from vehicle driver monitoring system 300 may be used by applied intelligence platform 320 to perform complex data analytics and analysis of the driver and/or vehicle data. For example, rule engine 324 and model manager module 330 may be used to filter, tune, merge, calculate, and/or extrapolate the collected data in order to determine various driver performance indicators or evaluate driver behavior.

In some embodiments, information associated with one or more drivers, vehicles, and/or devices associated with a driver and/or vehicle may be stored and processed by applied intelligence platform 320. For example, identity/access module 326 may be configured to store information associated with particular drivers using vehicle driver monitoring system 300. With this arrangement, collected data and driver performance indicators may be uniquely associated with a specific driver. Similarly, device management module 328 may be configured to store information associated with particular devices that are part of vehicle driver monitoring system 300. For example, device management module 328 may store information associated with mobile devices (e.g., mobile device 302) dongles (e.g., dongle 304), cameras (e.g., camera 306), and/or other components included in vehicle driver monitoring system 300.

In some embodiments, identify information associated with a driver may be used to validate or confirm that the driver is the authorized or registered driver associated with vehicle driver monitoring system 300. In an example embodiment, biometric information associated with a driver may be used to validate or confirm the driver's identity. For example, biometric data may include facial recognition, fingerprints, voice identification, or other information that can be used to uniquely identify the driver.

In some embodiments, API 322 may be used to interact with and write programs (i.e., computer executable software) for components of applied intelligence platform 320. Additionally, memory 332 may be any non-transitory computer readable storage medium configured to store instructions for executing one or more programs associated with components of applied intelligence platform 320. For example, memory 332 may store instructions for executing one or more of the operations of rule engine 324, identity/access module 326, device management module 328, and/or model manager module 330.

Figure 4:
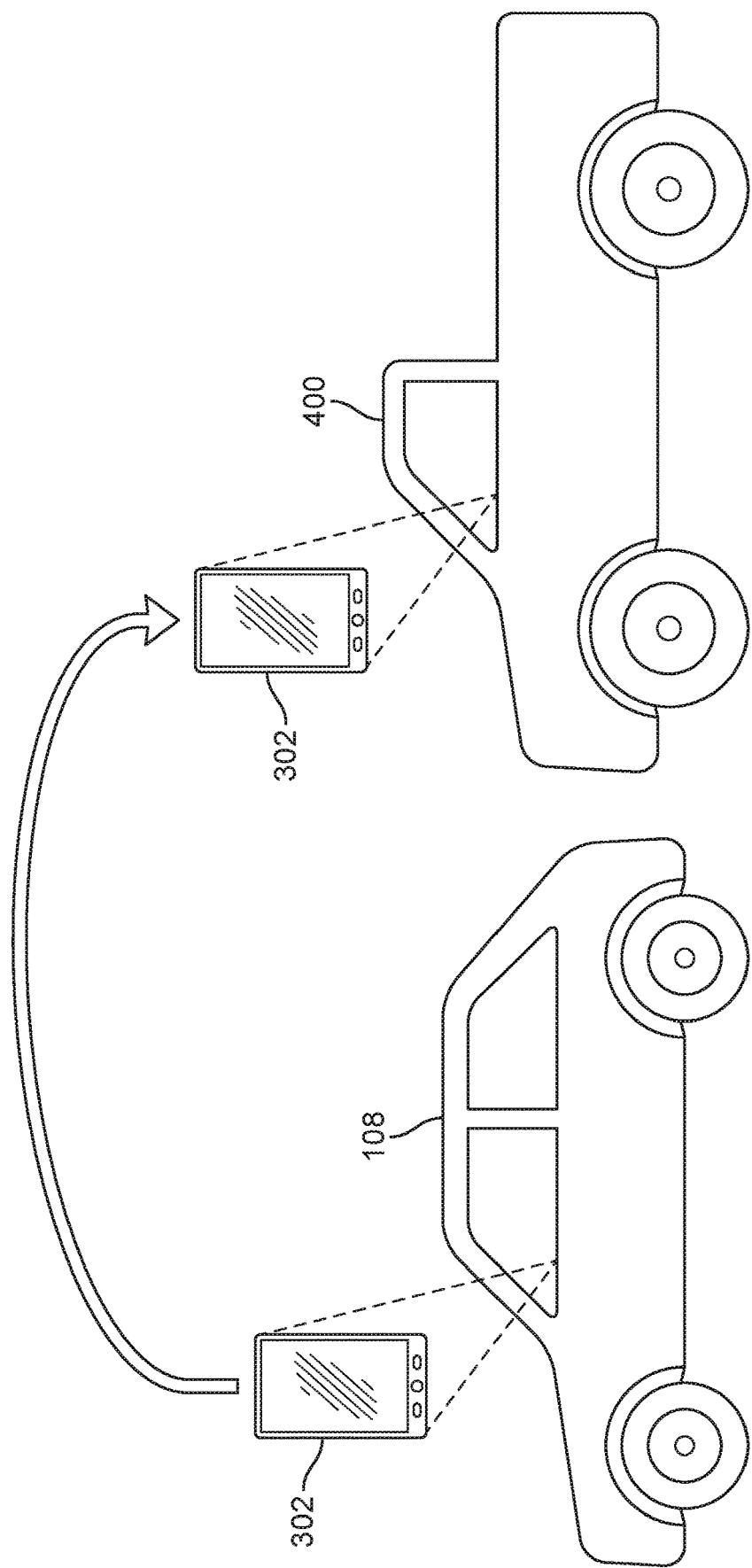
FIG. 4 is a representative diagram of an example embodiment of using a mobile device by a driver in multiple vehicles.

The vehicle driver monitoring system of the present embodiments provides an open system that is configured to be used with different vehicles and does not require proprietary protocols to use. The example embodiments provide a standardized or universal vehicle driver monitoring system that can be used in a variety of different vehicles. For example, as shown in FIG. 4, a driver may use mobile device 302 in vehicle 108 to collect driving data, determine driver performance indicators, and evaluate driver behavior. The same driver may then take mobile device 302 from vehicle 108 to a different vehicle, for example, a truck 400. The vehicle driver monitoring system of the present embodiments is configured to be implemented through mobile device 302 in truck 400 to also collect driving data, determine driver performance indicators, and evaluate driver behavior associated with the same driver (i.e., the owner of mobile device 302). That is, the driver can take her own device (e.g., mobile device 302) to any vehicle to enjoy the benefits of the vehicle driver monitoring system of the example embodiments.

Figure 5:
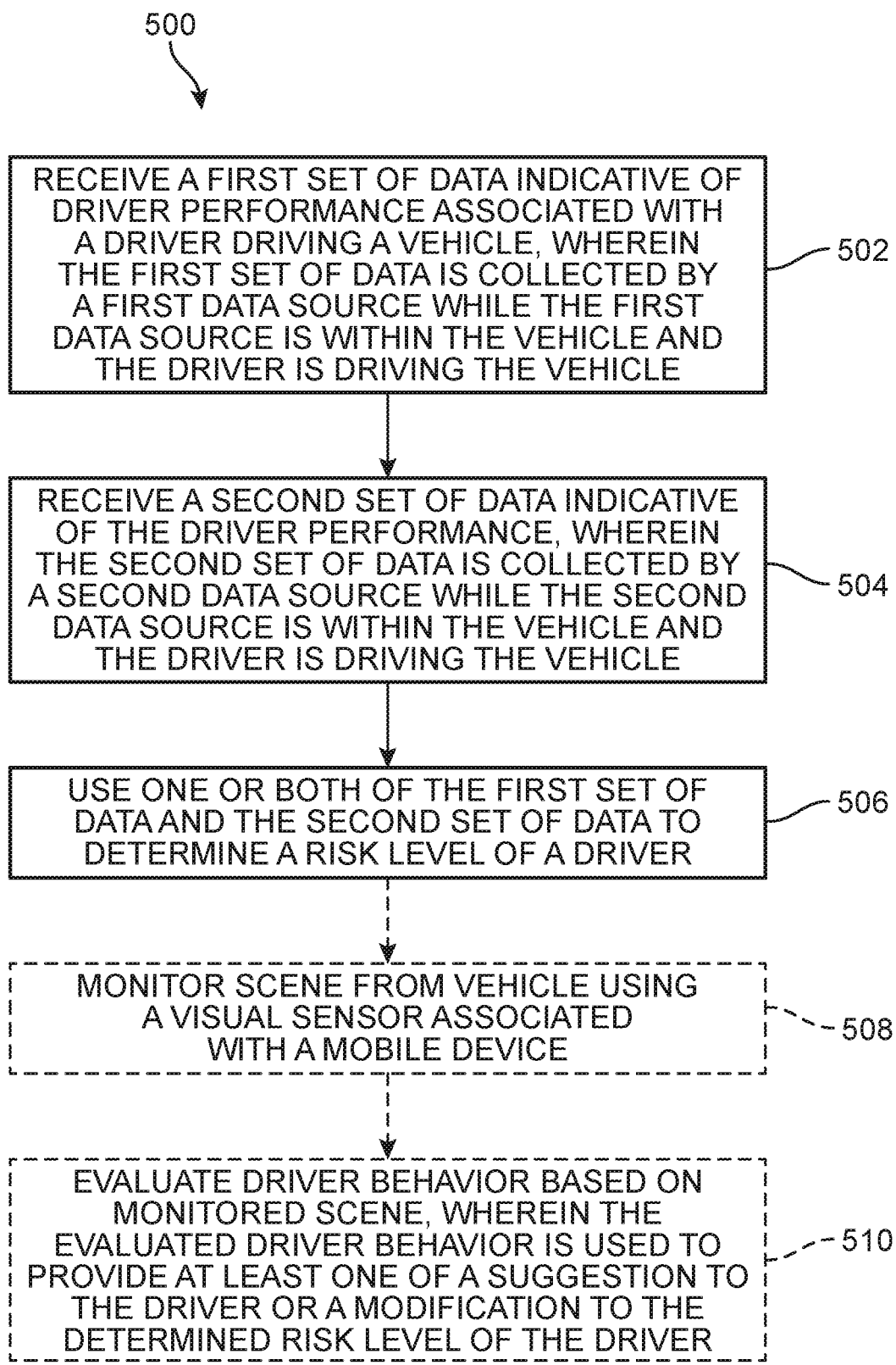
FIG. 5 is a flowchart of a method of using a vehicle driver monitoring system for capturing driver performance parameters.

Referring now to FIG. 5, a method 500 of using a vehicle driver monitoring system for capturing driver performance parameters is illustrated. In an example embodiment, method 500 may be implemented by any one or more of vehicle driver monitoring system 100, 200, and/or 300, described above. In this embodiment, method 500 may begin at an operation 502. At operation 502, a first set of data indicative of driver performance associated with a driver driving a vehicle is received. The first set of data received at operation 502 may be collected by a first data source while the first data source is within the vehicle and the driver is driving the vehicle. For example, the first set of data may be received from a mobile device (e.g., mobile device 102, 202, 302, shown in FIGS. 1-3 above).

Next, method 500 includes an operation 504. At operation 504, a second set of data indicative of the driver performance is received. The second set of data received at operation 504 may be collected by a second data source while the second data source is within the vehicle and the driver is driving the vehicle. For example, the second set of data may be received from a dongle (e.g., dongle 104, 204, 304). Upon receiving the first set of data (from operation 502) and the second set of data (from operation 504), method 500 may proceed to an operation 506. At operation 506, one or both of the first set of data and the second set of data are used to determine a risk level of a driver.

In some embodiments, method 500 may end upon completion of operation 506. Method 500 may be implemented again upon initiation of a new driving event or upon request by a driver. In some embodiments, method 500 may include additional or optional operations. For example, in embodiments where a mobile device includes an artificial intelligence algorithm included with a mobile app on a mobile device, method 500 may include additional operations as shown in FIG. 5.

For example, in this embodiment, method 500 may be implemented by vehicle driver monitoring system 300 that includes an artificial intelligence algorithm associated with mobile app 308 on mobile device 302. In such embodiments, method 500 may further include an operation 508 where a scene from the vehicle is monitored using a visual sensor associated with a mobile device. For example, a camera or other visual sensor associated with mobile device 302 may be used at operation 508 to monitor a driving scene from the vehicle from the driver's point of view.

Next, in this embodiment, method 500 may also proceed to an operation 510. At operation 510, the driver's behavior may be evaluated based on the monitored scene (i.e., from operation 508). The evaluated driver behavior may be used to provide at least one of a suggestion to the driver or a modification to the determined risk level of the driver (e.g., as determined at operation 506). In this manner, the artificial intelligence algorithm associated with mobile app 308 on mobile device 302 is configured to monitor and evaluate, in real-time, the driver performance indicators and/or driver behavior within the vehicle. As described above, this information may be used to provide tips, suggestions, or recommendations to the driver, for example, using virtual assistant 310.

In addition, in some embodiments, a vehicle driver monitoring system of the present embodiments may be configured to run or execute in a demonstration (demo) mode. In the demo mode, the various features of the vehicle driver monitoring system and method described herein may be demonstrated using video and/or audio to show the system capabilities under different driving conditions and risk levels. This demo mode may be used by a driver to practice using the vehicle driver monitoring system or to attempt to improve the driver's risk level under test conditions.

In summary, the method of using a vehicle driver monitoring system for capturing driver performance parameters may include receiving a first set of data indicative of driver performance associated with a driver driving a vehicle. The first set of data may be collected by a first data source while the first data source is within the vehicle and the driver is driving the vehicle. The method may include receiving a second set of data indicative of the driver performance. The second set of data may be collected by a second data source while the second data source is within the vehicle and the driver is driving the vehicle. The method may include using one or both of the first set of data and the second set of data to determine a risk level of a driver. In some embodiments, the first set of data and the second set of data may both indicate the same driver performance parameter. In some embodiments, the method may include using the first set of data to determine validity of the second set of data. In some embodiments, the method may further include using the first set of data to compensate for the second set of data when the first set of data is determined to be invalid. In some embodiments, the first set of data may be indicative of a first driver performance parameter and the second set of data may be indicative of a second driver performance parameter that is different from the first driver performance parameter.

In some embodiments, the method may include the first data source being a mobile device having a mobile app capable of verifying that the mobile device is in the vehicle and/or verifying that the driver is driving the vehicle. In some embodiments, the method may further include verifying that the mobile device is in the vehicle and/or verifying that the driver is driving the vehicle. In such embodiments, verifying that the mobile device is in the vehicle and/or verifying that the driver is driving the vehicle includes using the mobile app to register the driver such that the mobile app automatically senses when the registered driver is in the vehicle with the mobile device. In other of such embodiments, verifying that the mobile device is in the vehicle and/or verifying that the driver is driving the vehicle may include connecting the mobile device to a short-range wireless communication system (e.g., Bluetooth) in the vehicle to verify that the mobile device is positioned in the vehicle. In yet other such embodiments, verifying that the mobile device is in the vehicle and/or verifying that the driver is driving the vehicle may include using an NFC tag to sense the presence of the mobile device in the vehicle. In embodiments with an NFC tag, the NFC tag may be disposed on a mobile device holder capable of receiving the mobile device.

In some embodiments, the first data source may be a mobile device and the second data source may be one of (1) a dongle configured to be in communication with an on-board diagnostics system of the vehicle and (2) a 360-degree camera. In some embodiments, the method may include (1) receiving a third set of data indicative of the driver performance, wherein the third set of data is collected by a third data source while the third data source is within the vehicle and the driver is driving the vehicle; and (2) using two or more of the first set of data, the second set of data, and the third set of data to determine a risk level of a driver.

The techniques presented herein provide a system and method that leverages artificial intelligence and data analytics applied to data generated by multiple sources within a vehicle, including an Internet-of-Things ecosystem, a mobile app, connected devices, and embedded software, that can provide important information and services to insurers and/or drivers. The present embodiments provide trusted detailed driver performance and behavior information, as well as details specific to a driver and a vehicle, at a low cost as an alternative to expensive aftermarket telematics units.

Additionally, the example embodiments provide a mechanism for capturing driver statistics and providing driver safety metrics without requiring an agreement with a third-party provider of telematics units.

While various embodiments of the invention have been described, the description is intended to be exemplary, rather than limiting, and it will be apparent to those of ordinary skill in the art that many more embodiments and implementations are possible that are within the scope of the invention. Accordingly, the invention is not to be restricted except in light of the attached claims and their equivalents. Also, various modifications and changes may be made within the scope of the attached claims.

The invention claimed is:

1. A method of using a vehicle driver monitoring system for capturing driver performance parameters, comprising:
receiving a first set of data indicative of driver performance associated with a driver driving a vehicle, the first set of data including at least a first acceleration and a first speed, wherein the first set of data is collected by a first data source while the first data source is within the vehicle and the driver is driving the vehicle and wherein the first data source is a mobile device;
receiving a second set of data indicative of the driver performance, the second set of data including at least a second acceleration and a second speed, wherein the second set of data is collected by a second data source while the second data source is within the vehicle and the driver is driving the vehicle, the second data source being different than the first data source and wherein the second data source is a dongle configured to be in communication with an on-board diagnostics system of the vehicle;
comparing the first set of data from the first data source to the second set of data from the second data source to validate or invalidate one of the first set of data or the second set of data;
wherein, upon determining that the first acceleration and the first speed are substantially the same as the second acceleration and the second speed, using both of the first set of data from the mobile device and the second set of data from the dongle to determine a risk level of a driver;
wherein, upon determining that at least one of the first acceleration and the first speed is different than at least one the second acceleration and the second speed, using only the first set of data from the mobile device to determine the risk level of a driver;
wherein the mobile device includes a mobile app capable of verifying that the mobile device is in the vehicle and/or verifying that the driver is driving the vehicle; and
wherein the method further comprises verifying that the mobile device is in the vehicle and/or verifying that the driver is driving the vehicle.

2. The method of claim 1, further comprising:
monitoring a scene from the vehicle using a visual sensor associated with the mobile device; and
evaluating driver behavior based on the monitored scene, wherein the evaluated driver behavior is used to provide at least one of a suggestion to the driver or a modification to the determined risk level of the driver.

3. The method of claim 1, wherein the first set of data and the second set of data each include a plurality of driver performance parameters.

4. The method of claim 3, wherein the plurality of driver performance parameters include speed, acceleration, braking, trajectory, number of overtakes, and/or distance from objects.

5. The method of claim 3, wherein the first set of data includes at least one driver performance parameter of the plurality of driver performance parameters that is not included in the second set of data.

6. The method of claim 1, wherein the mobile device is configured to compare the first set of data to the second set of data.

7. The method of claim 1, further comprising:
receiving a third set of data indicative of the driver performance, wherein the third set of data is collected by a third data source while the third data source is within the vehicle and the driver is driving the vehicle; and
using two or more of the first set of data, the second set of data, and the third set of data to determine the risk level of the driver.

8. The method of claim 1, wherein the mobile device is configured to implement an artificial intelligence algorithm for evaluating driver behavior.

9. The method of claim 1, wherein the method further comprises receiving the second set of data from the dongle at the mobile device.

10. The method of claim 1, wherein the mobile device is configured to be used by the driver in multiple vehicles.

11. The method of claim 1, wherein verifying that the mobile device is in the vehicle and/or verifying that the driver is driving the vehicle includes using the mobile app to register the driver such that the mobile app automatically senses when the registered driver is in the vehicle with the mobile device.

12. The method of claim 1, wherein verifying that the mobile device is in the vehicle and/or verifying that the driver is driving the vehicle includes connecting the mobile device to a short-range wireless communication system in the vehicle to verify that the mobile device is positioned in the vehicle.

13. The method of claim 1, wherein verifying that the mobile device is in the vehicle and/or verifying that the driver is driving the vehicle includes using a near-field communication (NFC) tag to sense the presence of the mobile device in the vehicle.

14. The method of claim 13, wherein the NFC tag is disposed on a mobile device holder capable of receiving the mobile device.

15. The method of claim 7, wherein the third data source is a 360-degree camera.

16. A non-transitory computer-readable medium storing instructions executable by one or more computers which, upon such execution, cause the one or more computers to:
receive a first set of data indicative of driver performance associated with a driver driving a vehicle, the first set of data including at least a first acceleration and a first speed, wherein the first set of data is collected by a first data source while the first data source is within the vehicle and the driver is driving the vehicle and wherein the first data source is a mobile device;
receive a second set of data indicative of the driver performance, the second set of data including at least a second acceleration and a second speed, wherein the second set of data is collected by a second data source while the second data source is within the vehicle and the driver is driving the vehicle, the second data source being different than the first data source and wherein the second data source is a dongle configured to be in communication with an on-board diagnostics system of the vehicle;
compare the first set of data from the first data source to the second set of data from the second data source to validate or invalidate one of the first set of data or the second set of data;
wherein, upon determining that the first acceleration and the first speed are substantially the same as the second acceleration and the second speed, use both of the first set of data from the mobile device and the second set of data from the dongle to determine a risk level of a driver;
wherein, upon determining that at least one of the first acceleration and the first speed is different than at least one the second acceleration and the second speed, use only the first set of data from the mobile device to determine the risk level of a driver;
wherein the instructions further cause the one or more computers to:
monitor a scene from the vehicle using a visual sensor associated with the mobile device; and
evaluate driver behavior based on the monitored scene, wherein the evaluated driver behavior is used to provide at least one of a suggestion to the driver or a modification to the determined risk level of the driver.

17. The non-transitory computer-readable medium storing instructions of claim 16, further causing the one or more computers to:
receive the second set of data from the dongle at the mobile device.

18. The non-transitory computer-readable medium storing instructions of claim 16, further causing the one or more computers to:
receive a third set of data indicative of the driver performance, wherein the third set of data is collected by a third data source while the third data source is within the vehicle and the driver is driving the vehicle; and
use two or more of the first set of data, the second set of data, and the third set of data to determine the risk level of the driver.

19. A vehicle driver monitoring system for capturing driver performance parameters, comprising:
one or more computers and one or more storage devices storing instructions that are operable, when executed by the one or more computers, to cause the one or more computers to:
receive a first set of data indicative of driver performance associated with a driver driving a vehicle, the first set of data including at least a first acceleration and a first speed, wherein the first set of data is collected by a first data source while the first data source is within the vehicle and the driver is driving the vehicle and wherein the first data source is a mobile device;
receive a second set of data indicative of the driver performance, the second set of data including at least a second acceleration and a second speed, wherein the second set of data is collected by a second data source while the second data source is within the vehicle and the driver is driving the vehicle, the second data source being different than the first data source and wherein the second data source is a dongle configured to be in communication with an on-board diagnostics system of the vehicle;
compare the first set of data from the first data source to the second set of data from the second data source to validate or invalidate one of the first set of data or the second set of data;
wherein, upon determining that the first acceleration and the first speed are substantially the same as the second acceleration and the second speed, use both of the first set of data from the mobile device and the second set of data from the dongle to determine a risk level of a driver;
wherein, upon determining that at least one of the first acceleration and the first speed is different than at least one the second acceleration and the second speed, use only the first set of data from the mobile device to determine the risk level of a driver;
the instructions further causing the one or more computers to:
monitor a scene from the vehicle using a visual sensor associated with the mobile device; and
evaluate driver behavior based on the monitored scene, wherein the evaluated driver behavior is used to provide at least one of a suggestion to the driver or a modification to the determined risk level of the driver.

20. The vehicle driver monitoring system of claim 19, wherein the mobile device includes a mobile app capable of verifying that the mobile device is in the vehicle and/or verifying that the driver is driving the vehicle; and
wherein the instructions further cause the one or more computers to:

verify that the mobile device is in the vehicle and/or verifying that the driver is driving the vehicle.

\* \* \* \* \*